United States Patent
Raz et al.

(10) Patent No.: US 10,681,069 B2
(45) Date of Patent: Jun. 9, 2020

(54) TIME-BASED DETECTION OF MALWARE COMMUNICATIONS

(71) Applicant: HEWLETT PACKARD ENTERPRISE DEVELOPMENT LP, Houston, TX (US)

(72) Inventors: Barak Raz, Tel Aviv (IL); Sasi Siddharth Muthurajan, Boston, MA (US)

(73) Assignee: MICRO FOCUS LLC, Santa Clara, CA (US)

(*) Notice: Subject to any disclaimer, the term of this patent is extended or adjusted under 35 U.S.C. 154(b) by 165 days.

(21) Appl. No.: 15/409,760

(22) Filed: Jan. 19, 2017

(65) Prior Publication Data
US 2018/0205753 A1    Jul. 19, 2018

(51) Int. Cl.
    *H04L 29/06*    (2006.01)
    *G06F 21/56*    (2013.01)
    *G06F 21/55*    (2013.01)

(52) U.S. Cl.
    CPC ........ *H04L 63/1425* (2013.01); *G06F 21/554* (2013.01); *G06F 21/566* (2013.01); *H04L 63/145* (2013.01)

(58) Field of Classification Search
    CPC ............... H04L 63/1425; H04L 63/145; H04L 63/1416; H04L 2463/144; H04L 61/1511; H04L 63/1433
    See application file for complete search history.

(56) References Cited

U.S. PATENT DOCUMENTS

| | | | |
|---|---|---|---|
| 8,713,676 B2 | 4/2014 | Pandrangi et al. | |
| 9,917,852 B1* | 3/2018 | Xu | H04L 63/1416 |
| 2012/0084860 A1* | 4/2012 | Cao | H04L 63/1441 726/23 |
| 2014/0090058 A1* | 3/2014 | Ward | H04L 63/1433 726/23 |
| 2015/0195299 A1* | 7/2015 | Zoldi | H04L 63/1433 726/25 |
| 2016/0026796 A1* | 1/2016 | Monrose | G06F 21/562 726/24 |
| 2016/0057165 A1* | 2/2016 | Thakar | G06F 21/56 726/24 |
| 2016/0065611 A1 | 3/2016 | Fakeri-Tabrizi et al. | |
| 2016/0156660 A1 | 6/2016 | Dagon et al. | |
| 2016/0294852 A1* | 10/2016 | Hagen | H04L 63/1425 |
| 2016/0337391 A1* | 11/2016 | McKinney | H04L 63/1433 |
| 2017/0155667 A1* | 6/2017 | Sobel | H04L 63/1416 |

(Continued)

OTHER PUBLICATIONS

Maria Jose Erquiaga et al., "Detecting DGA Malware Traffic Through Behavioral Models," Jun. 10, 2016, pp. 1-6, IEEE.

(Continued)

*Primary Examiner* — Trang T Doan
*Assistant Examiner* — Jessica J South

(57) ABSTRACT

A technique includes processing domain name system queries generated by a host to identify a subset of the queries for which domain names were not resolved. The technique includes using a time-based analysis to detect domain generation algorithm-based malware communications by the host, including detecting malicious communications by the host based at least in part on a number of the queries of the identified subset and a time span within which the queries of the subset were generated.

15 Claims, 8 Drawing Sheets

(56) References Cited

U.S. PATENT DOCUMENTS

2017/0295196 A1* 10/2017 Arnell ................... H04L 69/40
2018/0069878 A1*  3/2018 Martini ............... H04L 61/1511
2018/0337943 A1* 11/2018 Arnell ................... H04L 41/08

OTHER PUBLICATIONS

Nart Villeneuve and James Bennett, "Detecting APT Activity with Network Traffic Analysis," Research Paper, 2012, pp. 1-15, Trend Micro Incorporated.

Antonakakis, Manos; "Detecting Malware Domains at the Upper DNS Hierarchy"; Sec. 11, Proceedings of the 20th USENIX Conference on Security; Aug. 8, 2011; 16 pp.

Bilge, Leyla; "Exposure: A Passive DNS Analysis Service to Detect and Report Malicious Domains"; ACM Transactions on Information and System Security 16., 10.1145/2584679; Apr. 2014; 25 pp.

Zhao, Guodong, Xu, Ke; "Detecting APT Malware Infections Based on Malicious DNS and Traffic Analysis"; IEEE, Special Section on Big Data for Green Communications and Computing; 10.1109/ACCESS.2015.2458581; May 2015; 11 pp.

* cited by examiner

TIME-BASED DETECTION OF MALWARE COMMUNICATIONS

BACKGROUND

Malicious software (viruses, worms, spyware, and so forth), or "malware," may use the Domain Name System (DNS) to autonomously identify and connect with one or multiple Command & Control (C&C) servers over the Internet for such purposes as exfiltrating data from a host and in general, coordinating actions that are taken by the malware. The DNS protocol allows for the identification of a destination Internet Protocol (IP) address based on a domain name that is supplied as part of a DNS query. To avoid detection by security software, the malware may use a Domain Generation Algorithm (DGA) to cause an infected host to attempt to connect with a number of seemingly random domains (through the use of multiple DNS queries) until a valid IP address is returned by a DNS server. In this manner, the DGA may generate a list of seemingly random domain names based on a seed (the current date, for example), and the malware sends out DNS queries to the corresponding domains. The C&C servers for the malware use the same DGA so that the C&C servers may temporarily bind one or more of the domains to an IP address.

DETAILED DESCRIPTION

Figure 1:
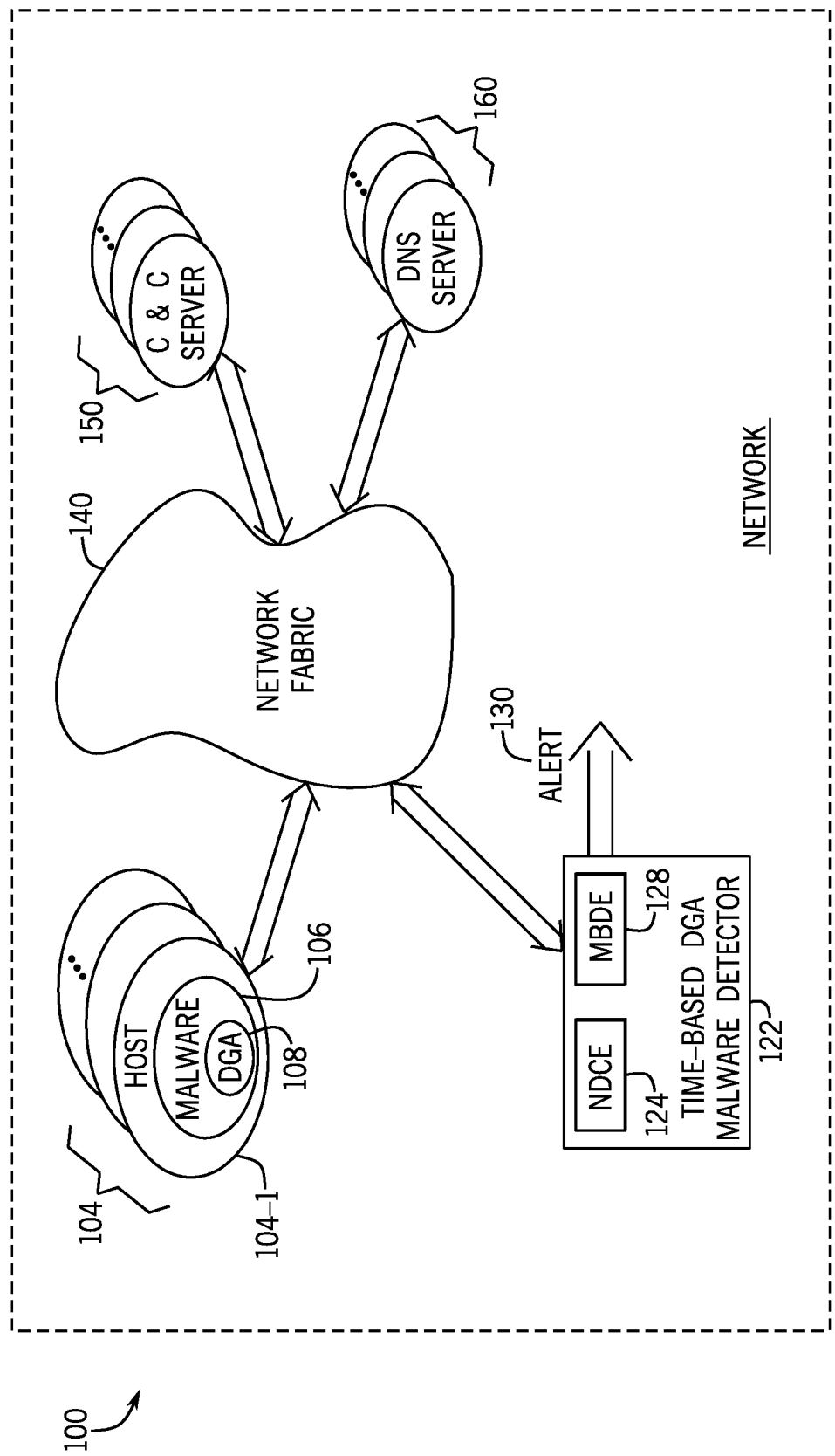
FIG. 1 is a schematic diagram of a network according to an example implementation.

One way to detect whether a given host is infected with or compromised by malware is to analyze the host's associated network traffic for purposes of identifying actual or attempted communications (called "malicious communications" herein) between the host and malware-affiliated command and control (C&C) servers. In this context, a "host" refers to any electronic device that may be potentially infected with or compromised by malware, such as a client, a server, a desktop computer, a laptop computer, a cellular telephone, a smartphone, a notebook computer, a tablet computer, thin client and so forth. Moreover, "malware," in general, refers to unauthorized machine executable instructions (or "software") on a host and whose execution results in one or multiple unauthorized actions. As examples, the malware may be machine executable instructions that are associated with a virus, spyware, a worm, a Trojan horse, and so forth; and in general, the malware may communicate with C&C servers for such purposes as coordinating/controlling actions that are taken by the malware, propagating the malware within a host, propagating the malware between or among hosts, exfiltrating data from a host, and so forth. In the following discussion, a reference to malware performing an action (submitting a query to the network, communicating data over the network, and so forth) means that a processing resource (a central processing unit (CPU) or CPU processing core of the host, for example) executes the malware to cause the processing resource to perform the action.

One way to detect malicious communications is to use reputation databases to determine when the host communicates with recognized C&C server domains. Malware may, however, avoid communication with reputed C&C server domains for purposes of avoiding such reputation database-based detection. For example, malware may contain a Domain Generation Algorithm (DGA)-based generator to generate seemingly random, or pseudo random, domain names for C&C server communications and due to their random nature, the domains may not be identified using a reputation database. In this manner, malware that uses a DGA-based generator may, in a relatively short time frame (a time frame under ten seconds, for example), send out a relatively large number of DNS queries (20 to 30 queries, for example) from the host for purposes of communicating with one or multiple C&C servers that are temporarily bound to one or multiple domains that are identified in the DNS queries.

In accordance with example implementations that are described herein, a time-based approach is used to detect malicious communications. In this manner, in accordance with example implementations, potentially anomalous DNS queries (e.g., queries possessing one or multiple characteristics associated with queries) by a host are identified in a manner that differentiates these queries from benign DNS queries (DNS queries generated by scripts, for example); and the time rate of the identified, potentially anomalous DNS queries may be used to make a determination of whether or not these queries are actual, anomalous DNS queries. For example implementations that are described herein, the time-based approach is used to detect DGA-based malicious communications, i.e., communications that are generated by malware that uses a DGA-based generator. However, in accordance with further example implementations, time-based approaches, such as the ones that are described herein, may be used for purposes of detecting malicious communications other than malicious communications that are generated by DGA-based malware. In general, in accordance with example implementations, the techniques and systems that are described herein may be used to detect any communication anomalies that are associated with a relatively high frequency malicious communications.

More specifically, in accordance with example implementations, the time-based approach for detecting DGA-based malicious communications may make one or more of the following assumptions. DGA-based malware may tend to generate DNS queries that are directed to multiple domains within a relatively short interval of time (a time interval under ten seconds, for example), which is referred to as a "time span" herein. In accordance with some implementations, a time block (a block of 2 hours, for example) of network traffic may be analyzed in predetermined time segments (7 second time spans, for example) for purposes of determining whether a set of DNS queries that are generated by a given host with each time segment are anomalous, i.e., whether the DNS queries are associated with malicious communications. Each domain that is generated through the use of the DGA within a given time span may be assumed to be different, in accordance with example implementations.

Moreover, in accordance with example implementations, the time-based approach for detecting DGA-based malicious communications may assume that the vast majority of DGA-generated DNS queries may result in DNS server responses that indicate that the domains that are targeted by the DNS queries are unavailable. In this manner, in accordance with example implementations, it may be assumed that a DNS server, for the majority of DGA-generated DNS queries, sends back NXDOMAIN responses indicating that the domains targeted by the queries are unresolvable. In general, an NXDOMAIN response refers to a message that is sent by a DNS server in response to a DNS query when the domain is not bound to an Internet Protocol (IP) address or the server is associated with the domain being offline. In accordance with example implementations, the time-based approach for detecting DGA-based malicious communications may assume that the vast majority of DGA-generated DNS queries within a relatively short time frame are directed to domains that are not bound to IP addresses and correspondingly result in NXDOMAIN responses.

Another assumption that may be made, in accordance with example implementations, is that the DGA may use the current date as the seed for the pseudo random generation of the domain names, and as a result, a DGA-generated domain name may not repeat within a certain period of time (a period of 24 hours, for example). Another assumption that may be made, in accordance with example implementations, is that DGAs create names that may or may not be valid English words. Therefore, in accordance with example implementations, no assumptions may be made, regarding the structure of the domain name itself.

The above assumptions are just a few observations that may be made to keep the DGA-based malware detection generic, in accordance with example implementations, for purposes of allowing the detection to evolve with future tactics that may be employed by DGA-based malware.

As a more specific example, FIG. 1 depicts a network 100 in accordance with example implementations. In general, the network 100 includes network fabric 140, which may be public network fabric, private network fabric, a combination of public and private network fabric, and so forth. In general, one or multiple hosts 104 may be coupled to the network fabric 140 and use the network fabric 140 to communicate with each other, as well as communicate with other network entities. In accordance with some implementations, the hosts 104 may be associated with the same business enterprise. A given host 104 may be any electronic device, such as a tablet computer, a server, a client, a desktop computer, a notebook computer, a smartphone, a thin client and so forth, depending on the particular implementation.

For the example scenario that is depicted in FIG. 1, at least one host 104, such as host 104-1, may be infected with or compromised by malware 106, and the malware 106 may contain a DGA-based generator 108 to generate domain names for DNS queries (i.e., anomalous DNS queries) for purposes of communicating with or attempting to communicate with one or multiple C&C servers 150 over the network 140. In this manner, the malware 106 may generate time bursts of DGA-based DNS queries several times per day for purposes of communicating with one or more C&C servers 150 to control/coordinate operations of the malware 106, exfiltrate data from the host 104-1, propagate the malware 106 within the host 104-1 and to other hosts 104, and so forth. The malicious communications associated with each time span may or may not result in the malware 106 communicating with a C&C server 150. For a given time burst of malicious communications, the DGA generator 108 may generate a relatively large number (20 to 30, for example) of pseudo random domain names in response to a seed (the current date, for example), and the malware 106 may correspondingly cause the host 104-1 to send out a relatively large number of DNS queries (20 to 30, for example) to the associated domains (i.e., each DNS query targets a domain having a DGA-generated domain name) within a relatively short period of time (a time period less than 10 seconds, for example). The C&C servers 150 have knowledge of the specific DGA-generated domain names so the servers 150 are aware of the domains that are targeted by the time burst of DNS queries. One or multiple of these domains may be bound to corresponding IP addresses so that a given time burst of DNS queries may be successful in establishing communication with one or multiple C&C servers 150, and if not, the malware 106 may succeed with the next round of malicious communications (i.e., the next time burst of DNS queries).

In accordance with example implementations, the network 100 includes a time-based DGA malware detector 122, which analyzes DNS queries that are generated by the hosts 104 as well as the corresponding responses by DNS servers 160 for purposes of detecting malicious communications.

In accordance with example implementations, the time-based DGA malware detector 122 may be disposed on-site in an enterprise's network for purposes of analyzing network traffic with the hosts 104 in real or near real time. For example, the DGA malware detector 122 may use such techniques as mirroring, port taping, sniffing, as well as other techniques. In accordance with some implementations, the DGA malware detector 122 may aggregate network traffic data and analyze it at a later time. Moreover, in accordance with some implementations, the DGA malware detector 122 may be disposed off-site (as part of a cloud service, for example) for purposes of aggregating and/or analyzing the network traffic data. Thus, many implementations are contemplated, which are within the scope of the appended claims.

In accordance with example implementations, the time-based DGA malware detector 122 may include a network data capture engine 124 and a malicious behavior detection engine 128. Depending on the particular implementation, the engines 124 and 128 may be separate network components or may be part of the same network component.

The network data capture engine 124, in general, collects and logs network traffic data, which may be associated with one or multiple hosts 104. The malicious behavior detection engine 128 analyzes network traffic within associated time windows, or time spans, for purposes of collecting, or logging, network traffic whose behavior is consistent with being malicious. More specifically, in accordance with example implementations, the malicious behavior detection engine 128, as further described herein, processes network traffic associated for a given host 104, such as host 104-1, during a given time span, (a time span less than 10 seconds, such as a time span of seven seconds, for example) for purposes of identifying a collection, or set, of potentially anomalous DNS queries (also called "candidate DNS queries" herein) that are provided by the host 104 during this time span. It is noted that for a given time span, the malicious behavior detection engine 128 may identify multiple sets of potentially anomalous queries, where each set is associated with a different host 104.

The malicious behavior detection engine 128, in accordance with example implementations, processes the identified sets of candidate DNS queries for purposes of determining whether each of these sets are anomalous. In accordance with example implementations, for a set of queries that is determined to be anomalous, the malicious behavior detection engine 128 may further process the set to remove any false positives (i.e., remove any DNS queries that are determined, upon subsequent processing, to be benign, or not associated with malicious communications).

In accordance with some implementations, upon detecting a malicious communication (i.e., in response to identifying a set of anomalous queries), the time-based DGA malware detector 122 may generate an alert 130 for purposes of informing personnel (personnel at a security operations center, for example) of the detected malicious communications. For example, in accordance with some implementations, the alert 130 may include storing data in a network-accessible memory, communicating a message to a security operations center, setting a flag, and so forth, for purposes of bringing attention to the identified anomalous queries. The time-based DGA malware detector 122 may, in accordance with example implementations, for a set of anomalous DNS queries, store data representing the queries, the identity of the host that provided the queries, the identity of the software on the host associated with the queries, the time and date of the queries, and so forth.

Figure 2:
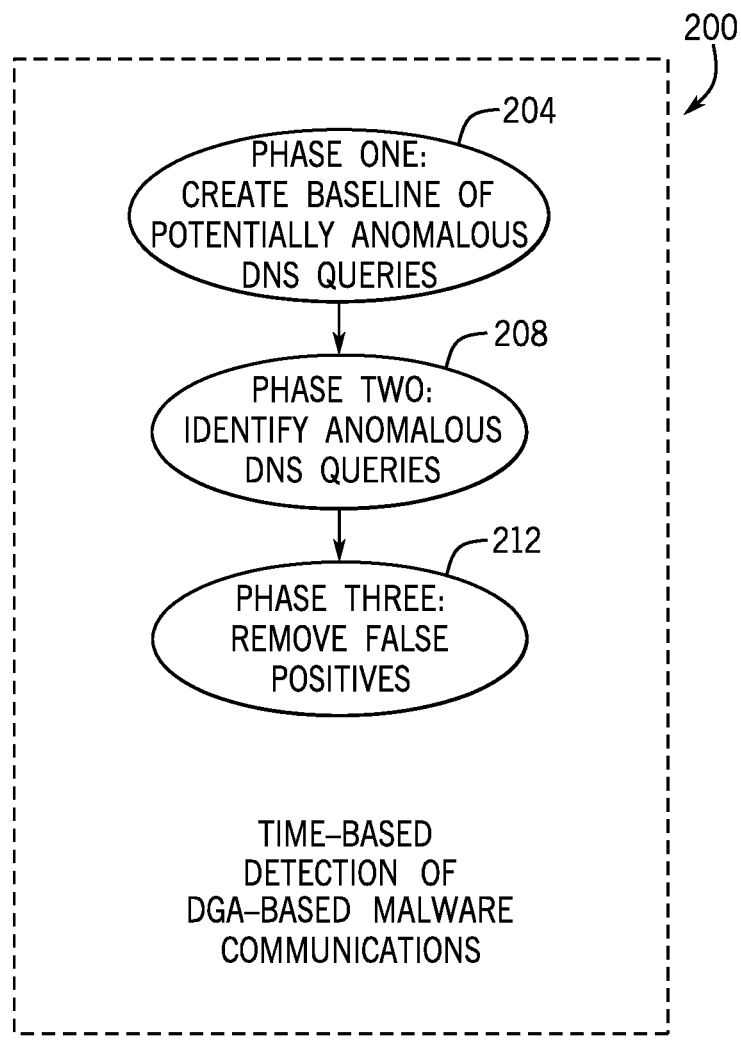
FIG. 2 is an illustration of phases associated with time-based detection of DGA-based malware communications according to an example implementation.

As a more specific example, in accordance with some implementations, the time-based DGA malware detector 122 may employ a process 200 (see FIG. 2) for detecting malicious communication by a given host. Referring to FIG. 2, the process 200 may include three phases: a first phase 204 in which the time-based DGA malware detector 122 creates a baseline from a raw dataset of network traffic. The baseline, which is further described herein, narrows down the amount of data being operated on for purposes of deriving a fingerprint of potentially anomalous queries that have been communicated with by one or multiple hosts 104. The baseline may include, for example, one or multiple sets of potentially anomalous queries for each host. In a second phase 208, the sets of potentially anomalous queries are processed to identify the sets that are considered to be anomalous, i.e., considered to be associated with malicious communications; and in a third phase 212, false positives are removed. The three phases 204, 208 and 212 are described in more detail below in connection with FIGS. 3, 4 and 5, respectively.

Figure 3:
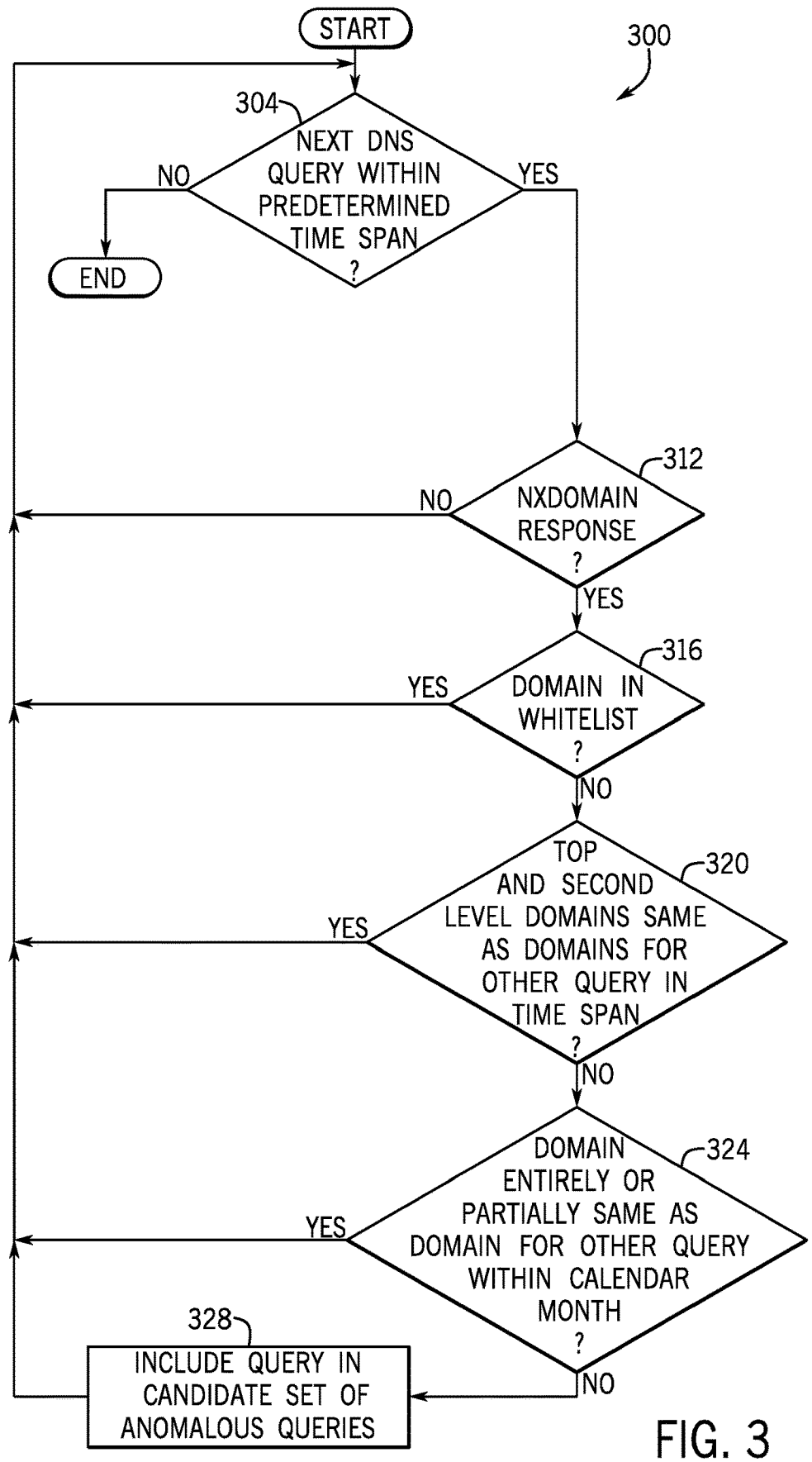
FIG. 3 is a flow diagram depicting a phase of the time-based detection associated with creating a baseline of potentially anomalous queries according to an example implementation.

More specifically, referring to FIG. 3 in conjunction with FIGS. 1 and 2, in accordance with some implementations, the malicious behavior detection engine 128 creates a baseline pursuant to a technique 300 for a given host IP address, i.e., for a given host 104. It is noted that, in accordance with example implementations, the technique 300 processes DNS queries within the time span for potentially identifying anomalous communications from multiple hosts 104. However, FIG. 3 illustrates the processing of DNS queries for a single host 104 for purposes of simplifying the following discussion. In general, the technique 300 is applied to a specific time interval, or time span, for purposes of identifying potentially anomalous queries that are associated with the time span. As a more specific example, in accordance with some implementations, the time span may be a continuous time interval of, for example, three to ten seconds (seven seconds, as a more specific example) of a larger segment of network data (a segment of two hours of network data, for example). In this regard, using the process depicted by technique 300, the malicious behavior detection engine 128 may generate multiple sets of potentially anomalous data (i.e., one set for each 3 to 10 second time span, for example). As examples, the time spans may be overlapping or non-overlapping time intervals, depending on the particular implementation.

Pursuant to the technique 300, the malicious behavior detection engine 128 determines (decision block 304) whether the next DNS query being processed is within the predefined time span. If not, then the processing of the time span has completed. Otherwise, the malicious behavior detection engine 128 determines (decision block 312) whether the currently processed DNS query is associated with an NXDOMAIN response. If not, control returns to decision block 304 to process the next DNS query and response. Otherwise, processing of the current DNS query and response continues by determining (decision block 316) whether the domain that is the subject of the DNS query is a domain on a white list (a list of recognized reputable, or "safe" domains, for example). In other words, if the malicious behavior detection engine 128 determines that the domain associated with the DNS request is part of the white list, then the domain is not associated with a C&C server, and control returns to decision block 304.

If the domain is not part of a white list, then the malicious behavior detection engine 128 determines (decision block 320) the domain name is similar to another domain name contained in another DNS query within the time span, thereby indicating that this DNS query (along with the other associated DNS response) is not generated by a DGA. More specifically, in accordance with some implementations, the malicious behavior detection engine 128 determines (decision block 320) whether the top level domain (a .com domain, a .org domain and so forth) and the second level domain of the currently-processed DNS query is the same as another top level domain and second domain associated with another DNS request processed in the same time span. For example, the domain name associated with the currently-processed DNS query may be "docs.exampledomainname.com," whereas the domain name contained in another DNS query within the same timeframe may be "records.exampledomainname.com." Because of the similarity in domain names, an assumption may be made, in accordance with example implementations, that it is unlikely that the DNS query was generated by a DGA. If this similarity is not observed, then the malicious behavior detection engine 128, in accordance with example implementations, determines (decision block 324) whether the domain is entirely or partially the same as a domain associated with another query, which was observed within the same time span (e.g., the last calendar month). As examples, the domain may share lower level or upper domain levels with another request observed within the last calendar month. This determination removes benign requests from, for example, standard scripts that are executed on a regular basis, and are not associated with malware or DGAs. If none of the above-described exemptions apply, then the malicious behavior detection engine 128 includes the query in the identified potential anomalous queries, as denoted in block 328, and control returns to decision block 304 for purposes of processing the DNS queries/responses for the remaining part of the analyzed time span.

Figure 4:
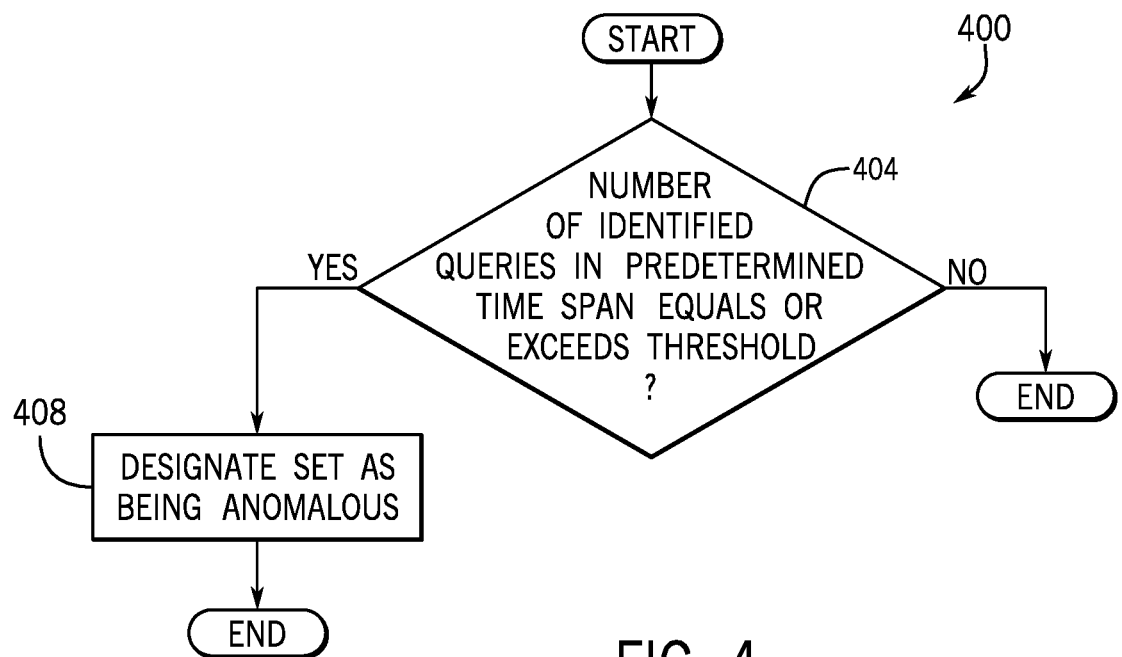
FIG. 4 is a flow diagram depicting a phase of the time-based detection associated with determining whether queries of the baseline are anomalous according to an example implementation.

FIG. 4 depicts an example process 400 for performing the second phase 208. In particular, referring to FIG. 4 in conjunction with FIGS. 1 and 2, pursuant to the technique 400, the malicious behavior detection engine 128 receives data representing sets of potentially anomalous queries, where each set is associated with a given host and a given time span. For each set, the malicious behavior detection engine 128, in accordance with example implementations, determines (block 404) whether the number of identified queries in the predefined time span equals or exceeds a threshold. As a more specific example, in accordance with some implementations, the malicious behavior detection engine 128 may determine whether the number of identified potentially anomalous queries exceeds three (as an example), and if so, the malicious behavior detection engine may then classify (block 408) the queries of the set as being anomalous. If the processing in phase two does not classify the anomalies as being anomalous, then the processing associated with the time span concludes, and a determination occurs that no malicious communication has been detected for this host and time span. However, if the result of phase two is a determination that the queries are anomalous, then the set is further processed in phase three.

Figure 5:
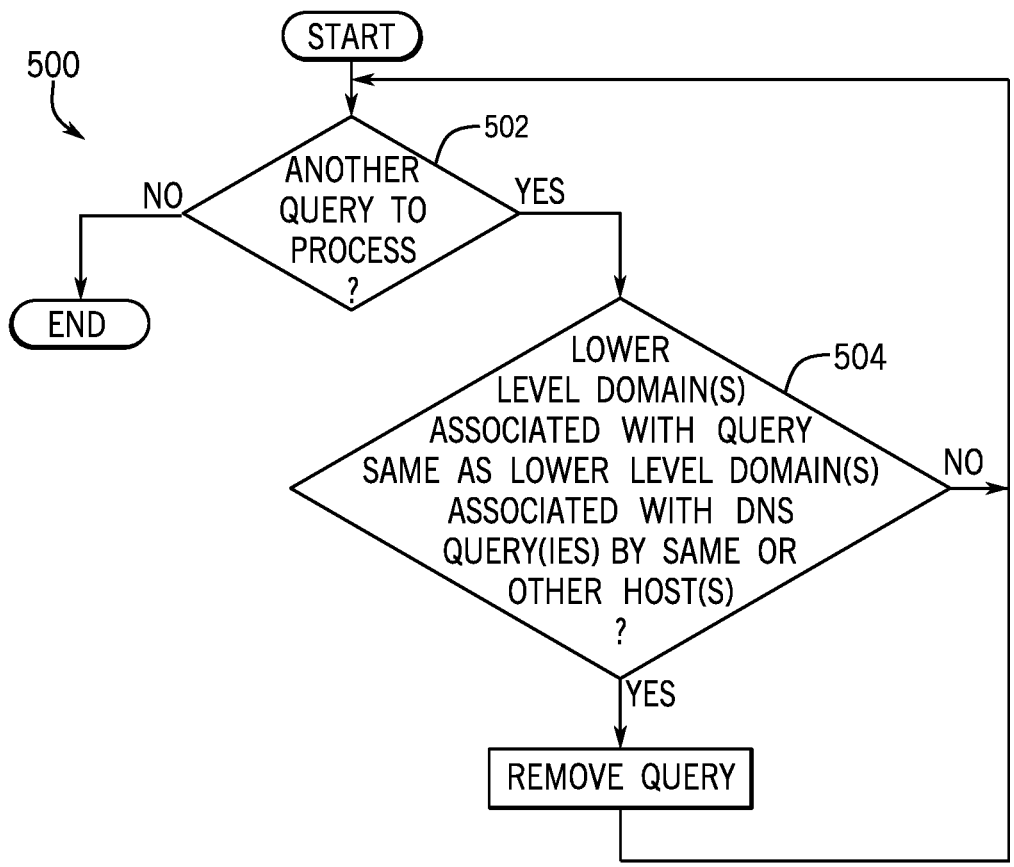
FIG. 5 is a flow diagram depicting a phase used to remove false positive anomalous queries according to an example implementation.

Referring to FIG. 5 in conjunction with FIGS. 1 and 2, in accordance with some implementations, in phase three, the malicious behavior detection engine 128 performs a technique 500 to process a given set determined to be anomalous for purposes of removing any false positive queries. More specifically, in accordance with some implementations, the malicious behavior detection engine 128, in response to determining (decision block 502) that at least one query of the set remains to be processed, determines (decision block 504) whether the query is associated with a benign script. For the specific example implementation that is depicted in FIG. 5, this determination involves determining whether one or multiple lower level domain(s) that are targeted by, or associated with, the query are the same as corresponding lower level domains(s) associated with one or multiple other DNS queries by one or multiple other hosts 104. In this manner, the hosts 104 may be part of a network of an enterprise, which subscribes to a service, and as part of this service, scripts may cause the hosts to generate DNS queries that have common lower level domains, but different top level and second level domains. For example, as part of a service, scripts may cause the hosts to generate DNS queries that are prefixed with the same lower level domain names. Although these DNS queries may be sent within relatively short time periods because they are generated by scripts and not by humans, the scripts are benign; and accordingly, such DNS queries may be treated as false positives. Therefore, in accordance with example implementations, the false positive removal by the malicious behavior detection engine 128 includes comparing lower level domains associated with DNS queries that have determined to be anomalous and removing any DNS query that is associated with lower level domains that occur multiple times.

Figure 6:
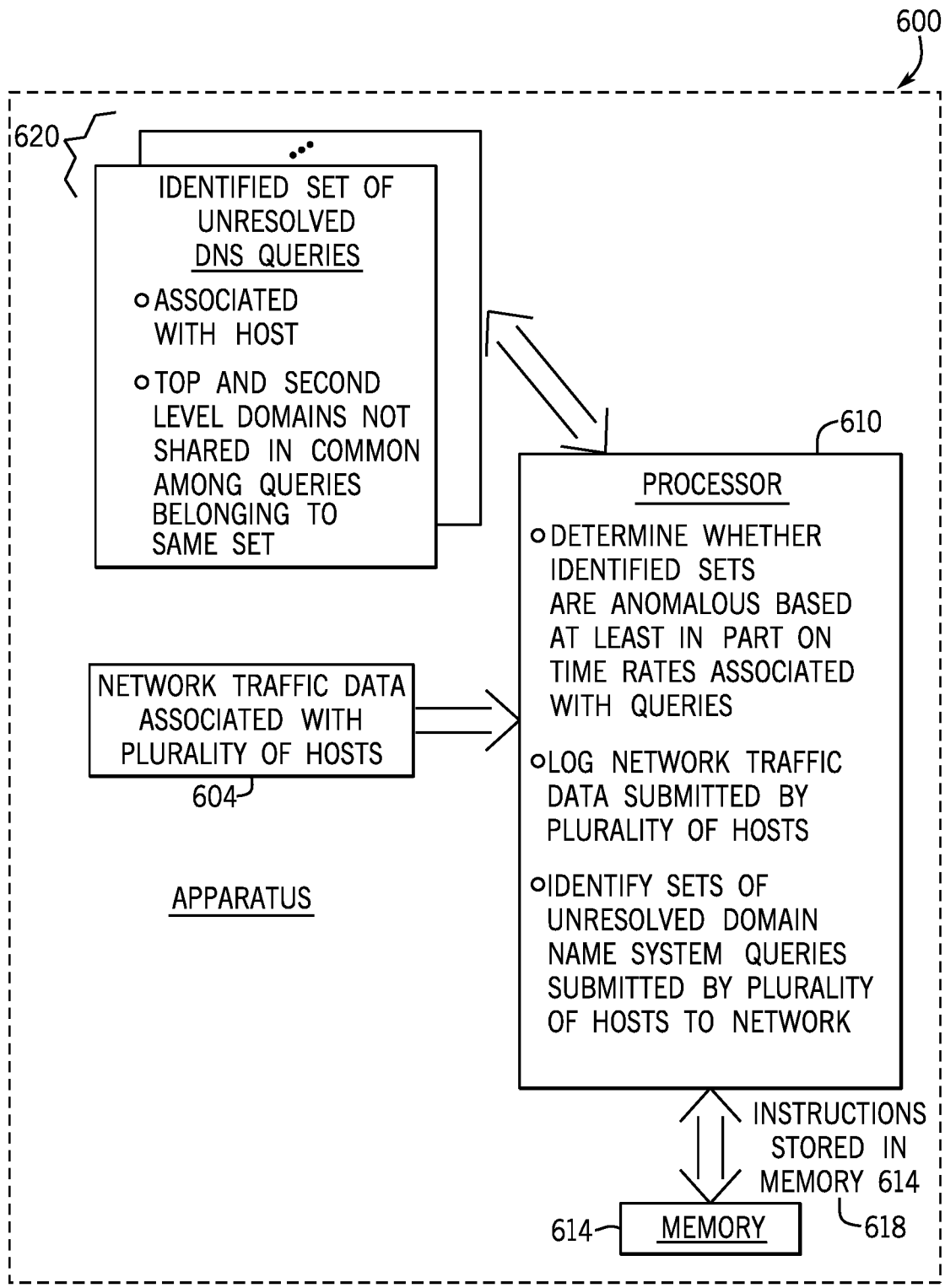
FIG. 6 is a schematic diagram of an apparatus to detect DGA-based malware communications by a host according to an example implementation.

Referring to FIG. 6, thus, in accordance with example implementations, an apparatus 600 includes a processor 610 (e.g., one or multiple CPUs and/or one or multiple CPU processing cores that are associated with one or multiple physical machines) and a memory 614 (e.g., a memory associated with one or multiple physical machines, a memory associated with a processor, a distributed memory associated with one or multiple processors of a multiple processor system, and so forth) that stores instructions 618. The instructions 618 when executed by the processor 610 cause the processor 610 to log network traffic data 604 that is associated with a plurality of hosts; and identify sets 620 of unresolved domain name queries, which are submitted by the hosts to the network. Each set 620 is associated with a host, and the top and second level domains are not shared in common among the queries belonging to the same set of queries. The instructions 618 when executed by the processor 610 cause the processor 610 to determine whether the identified sets 620 are anomalous based at least in part on time rates that are associated with the queries.

Figure 7:
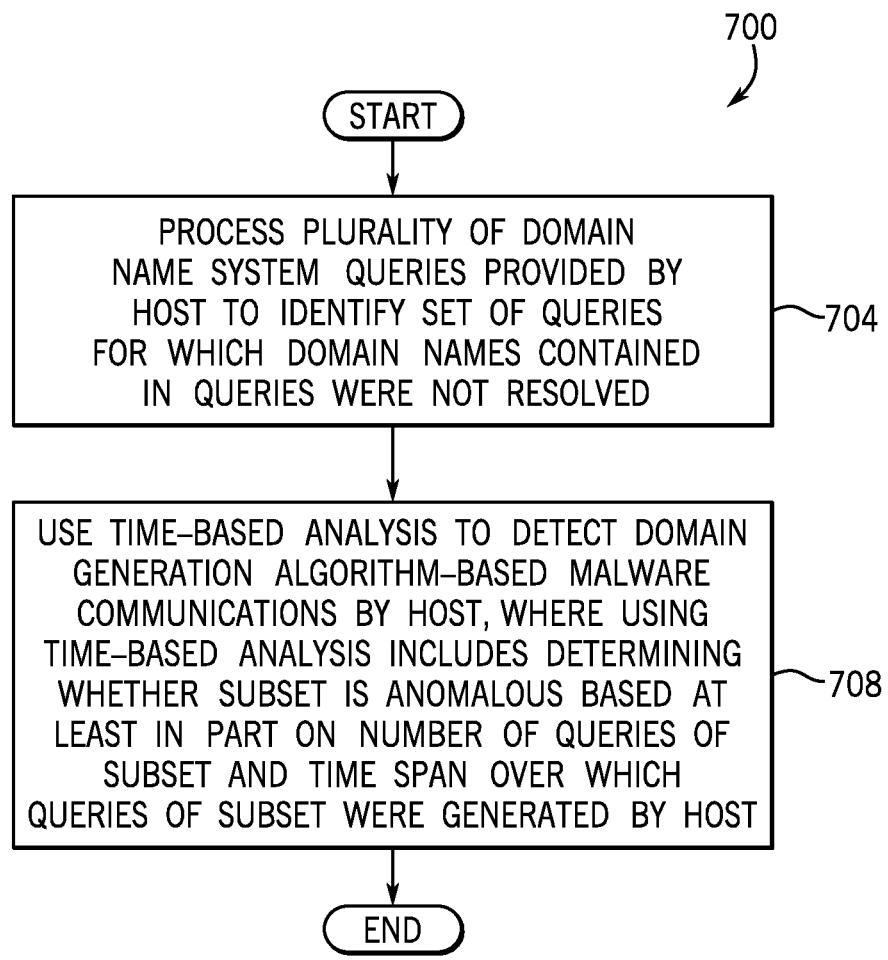
FIGS. 7 and 8 are flow diagrams depicting techniques to detect DGA-based malware communications by a host according to example implementations.

To summarize, in accordance with example implementations, a technique 700 that is depicted in FIG. 7 includes processing (block 704) DNS queries provided by a host to a network to identify a set of queries for which domain names contained in the queries were not resolved. The technique 700 includes, pursuant to block 708, using time-based analysis to detect domain generation algorithm-based malware communications by the host, where using the time-based analysis includes determining whether the subset is anomalous based at least in part on a number of the subsets and a time span over which queries of the subset were generated by the host.

Figure 8:
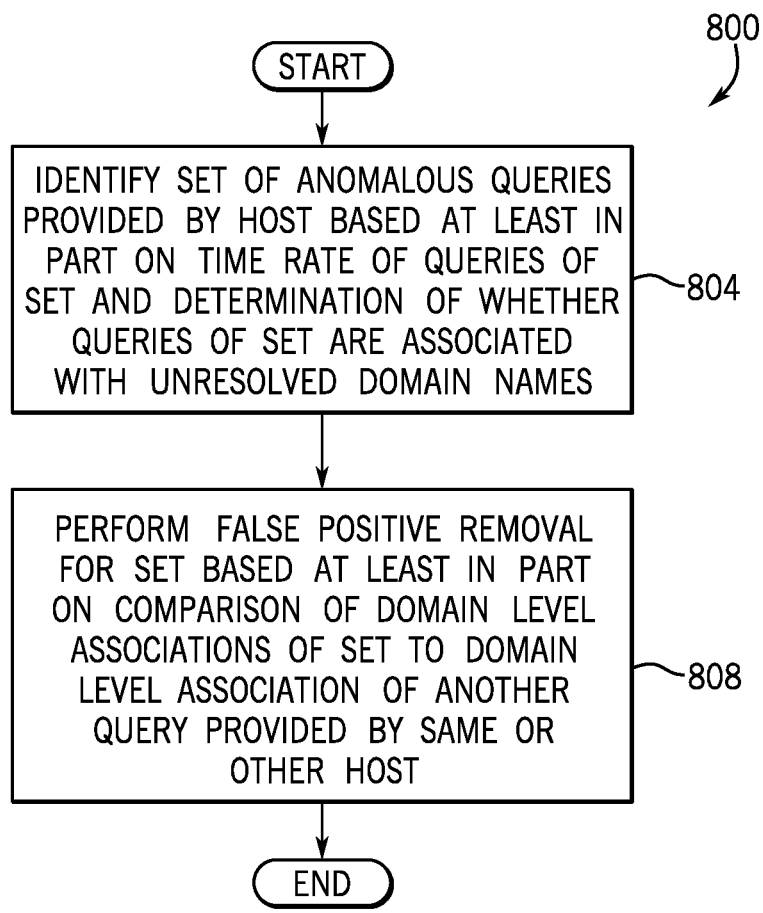

More specifically, referring to FIG. 8, in accordance with some implementations, a technique 800 includes identifying (block 804) a set of anomalous queries that are provided by a host based at least in part on a time rate of queries of the set and a determination of whether queries of the set are associated with unresolved domain names. The technique 800 includes performing (block 808) false positive removal for the set based at least in part on a comparison of domain level associations of the set to domain level association of another query that is provided by the same host or another host.

Figure 9:
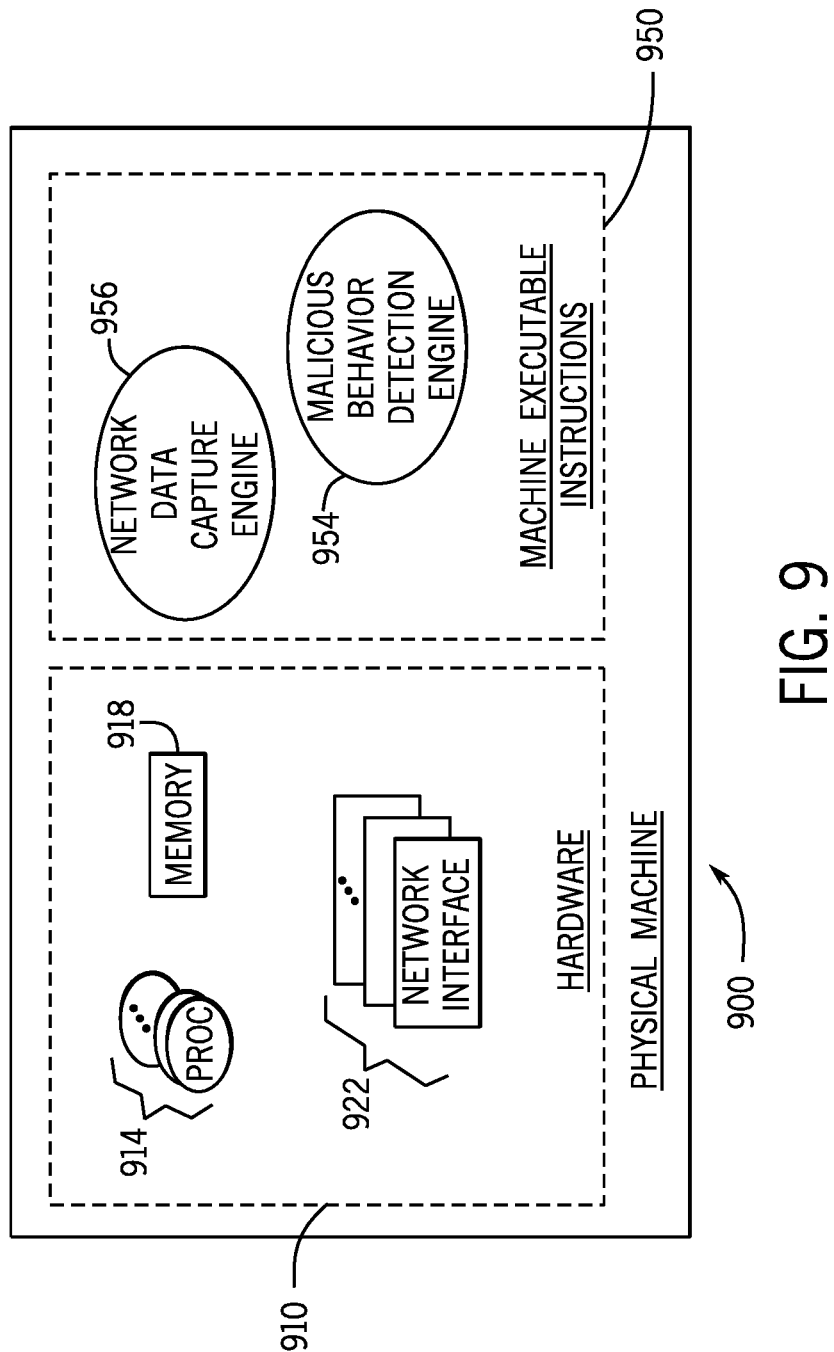
FIG. 9 is a schematic diagram of a physical machine according to an example implementation.

Referring to FIG. 9, in accordance with some implementations, the time-based DGA malware detector 122 (FIG. 1) may include one or multiple actual, physical machines 900. The physical machine 900 is made up of actual hardware 910 and machine executable instructions 950, or "software." In accordance with some implementations, the hardware 910 may include one or multiple processors 914 (e.g., one or multiple Central Processing Units (CPUs), one or multiple CPU processing cores, and so forth). The hardware 910 may include a memory 918 which may, for example, contain data representing one or more of the following: potentially anomalous queries, configuration parameters for time spans considered, determined anomalous queries, rules to be applied to eliminate false positives, rules to be applied to identify potentially anomalous queries, and so forth. Moreover, the memory 918 may contain instructions that, when executed by one or multiple processors 914, perform one or more of the techniques described herein.

In general, the memory 918 may be a non-transitory memory that may be formed from, as examples, semiconductor storage devices, memristors, magnetic storage devices, phase change memory devices, a combination of one or more of these storage technologies, and so forth, depending on the particular implementation.

In accordance with some implementations, the hardware 910 of the physical machine 900 may include various other components, such as, for example, one or multiple network interfaces 922, input/output (I/O) devices, a display and so forth.

In accordance with some implementations, the machine executable instructions 954 may include, for example, instructions 950 that when executed by the processor(s) 914, cause the processor(s) 914 to form the malicious behavior detection engine 128 (FIG. 1); instructions 956 that when executed by the processor(s) 914 cause the processor(s) 914 to form the network data capture engine 124 (FIG. 1); and so forth.

In accordance with further example implementations, all or part of the above-described processor-based architecture may be replaced by dedicated, hardware circuitry or by one or multiple Application Specific Integrated Circuits (ASICs). For example, in accordance with some implementations, the malicious behavior detection engine 128 and/or the network data capture engine 124 may be formed from one or multiple ASICs. Thus, many implementations are contemplated, which are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
processing a plurality of domain name system queries generated by a host to identify a subset of the domain name system queries for which domain names contained in the domain name system queries were not resolved, wherein:
a given domain name system query of the plurality of domain name system queries represents an inquiry to acquire an internet protocol address for at least part of a first domain name;
said at least part of the first domain name belongs to a top level domain and a second level domain; and
processing the plurality of domain name system queries comprises:
determining whether another domain name system query of the plurality of domain name system queries is within a predetermined time span and represents an inquiry to acquire an internet protocol address for a second domain name belonging to the top level domain and the second level domain; and
excluding the given domain name system query from the subset of the domain name system queries based on a result of the determination; and
using a time-based analysis to detect domain generation algorithm-based malware communications by the host, wherein using the time-based analysis comprises determining whether the subset is anomalous based at least in part on a number of the domain name system queries of the subset occurring within the predetermined time span.

2. The method of claim 1, wherein determining whether the subset is anomalous comprises comparing the number to a predetermined threshold.

3. The method of claim 1, wherein excluding the given domain name system query further comprises:
determining whether the given domain name system query represents an inquiry to acquire an internet protocol address for a domain name that is represented by a white list.

4. The method of claim 1, wherein using the time-based analysis determines that the subset is anomalous, the method further comprising:
performing false positive detection for the subset.

5. The method of claim 1, further comprising acquiring the plurality of domain name system queries through mirroring, port taping or sniffing.

6. The method of claim 1, wherein using the time-based analysis comprises determining whether the subset is anomalous based at least in part on the number occurring within a time span between three to ten seconds.

7. The method of claim 4, wherein a query of the subset represents an inquiry to acquire an internet protocol address for at least part of a third domain name; and the performing of the false positive detection comprises comparing said at least part of the third domain name to domain names associated with domain name requests submitted by a plurality of other hosts to determine whether the query of the subset is associated with a script generator.

8. The method of claim 4, wherein the performing of the false positive detection comprises determining whether second domain name system query of the set is associated with a domain that is associated with a domain name system query from the host or another host.

9. An article comprising a non-transitory computer readable storage medium to store instructions that, when executed by a computer, cause the computer to:
identify a set of anomalous queries provided by a first host based at least in part on a time rate of the anomalous queries of the set of anomalous queries and a determination of whether the anomalous queries of the set of anomalous queries are associated with unresolved domain names, wherein the time rate of the anomalous queries of the set of anomalous queries is based on a number of the anomalous queries of the set of anomalous queries occurring within a predetermined time span, wherein:
the first host provides a plurality of queries during the predetermined time span;
the plurality of queries comprises the set of anomalous queries;
a first query of the plurality of queries represents an inquiry to acquire an internet protocol address for at least part of a first domain name; and
said at least part of the first domain name belongs to a top level domain and a second level domain; and
identifying the set of anomalous queries comprises:
determining whether a second query of the plurality of queries is within the predetermined time span and represents an inquiry to acquire an internet protocol address for a second domain name belonging to the top level domain and the second level domain; and
excluding the first query from the set of anomalous queries based on a result of the determination.

10. The article of claim 9, wherein the instructions, when executed by the computer, further cause the computer to compare a lower level domain associated with a query of the set of anomalous queries to lower level domains associated with domain name service queries provided by a plurality of hosts to determine whether the query of the set of anomalous queries is associated with a script.

11. The article of claim 9, wherein the instructions, when executed by the computer, further cause the computer to generate an alert in response to an identification of the set of anomalous queries.

12. The article of claim 9, wherein the instructions, when executed by the computer, further cause the computer to perform false positive removal for the set of anomalous queries based at least in part on a comparison of domain level associations of the set of anomalous queries to a domain level association of another domain name service query provided by a second host other than the first host.

13. An apparatus comprising:
a processor; and
a memory storing instructions that, when executed by the processor cause the processor to:
log network traffic data submitted by a plurality of hosts to a network;
identify sets of unresolved domain name system queries submitted by the plurality of hosts to the network, wherein each set is associated with a host of the plurality of hosts; and
determine whether the sets are anomalous based at least in part on time rates associated with the sets occurring within respective predetermined time spans, wherein:
a first set of the sets is associated with a first host of the plurality of hosts and occurs within a first respective predetermined time span of the respective predetermined time spans;
the first host provides a plurality of queries during the first respective predetermined time span;
a first query of the plurality of queries represents an inquiry to acquire an internet protocol address for at least part of a first domain name;
said at least part of the first domain name belongs to a top level domain and a second level domain; and
determining whether the sets are anomalous comprises:
determining whether a second query of the plurality of queries is within the first respective predetermined time span and represents an inquiry to acquire an internet protocol address for a second domain name belonging to the top level domain and the second level domain; and
excluding the first query from the first set based on a result of determining whether the second query is within the first respective predetermined time span and represents the inquiry to acquire the internet protocol address for the second domain name.

14. The apparatus of claim 13, wherein the instructions, when executed by the processor, further cause the processor to perform false positive removal on a given set of the identified sets associated with a given host of the plurality of hosts based at least in part on comparisons of queries of the given set to queries associated with hosts of the plurality of hosts other than the given host.

15. The apparatus of claim 14, wherein the performing of the false positive removal comprises removing queries associated with automatic scripts.

* * * * *